United States Patent
Rodoni

(10) Patent No.: US 10,859,386 B2
(45) Date of Patent: Dec. 8, 2020

(54) WASTE MANAGEMENT SYSTEM HAVING ROADWAY CONDITION DETECTION

(71) Applicant: Rubicon Global Holdings, Inc., Altanta, GA (US)

(72) Inventor: Philip Rodoni, Decatur, GA (US)

(73) Assignee: Rubicon Global Holdings, LLC, Atlanta, GA (US)

( * ) Notice: Subject to any disclaimer, the term of this patent is extended or adjusted under 35 U.S.C. 154(b) by 142 days.

(21) Appl. No.: 15/432,028

(22) Filed: Feb. 14, 2017

(65) Prior Publication Data

US 2018/0231388 A1    Aug. 16, 2018

(51) Int. Cl.
*G01C 21/34* (2006.01)
*G06Q 10/00* (2012.01)
*G01C 21/36* (2006.01)

(52) U.S. Cl.
CPC ..... *G01C 21/3415* (2013.01); *G01C 21/3697* (2013.01); *G06Q 10/30* (2013.01); *Y02W 90/20* (2015.05)

(58) Field of Classification Search
CPC ............ G01C 21/3415; G01C 21/3697; G06Q 10/30; Y02W 90/20
See application file for complete search history.

(56) References Cited

U.S. PATENT DOCUMENTS

| | | | |
|---|---|---|---|
| 4,868,796 A | 9/1989 | Ahrens et al. | |
| 5,014,206 A | 5/1991 | Scribner et al. | |
| 5,467,268 A | 11/1995 | Sisley et al. | |
| 5,489,898 A | 2/1996 | Shigekusa et al. | |
| 5,699,525 A | 12/1997 | Embutsu et al. | |
| 6,124,810 A | 9/2000 | Segal et al. | |
| 6,360,186 B1 | 3/2002 | Durbin | |
| 6,766,244 B2 * | 7/2004 | Obata | G01C 21/26 340/988 |
| 6,792,351 B2 * | 9/2004 | Lutter | G08G 1/0965 701/418 |
| 6,915,268 B2 | 7/2005 | Riggs et al. | |
| 9,599,477 B1 * | 3/2017 | Aula | B60R 25/24 |
| 9,815,475 B2 * | 11/2017 | Spata | E01C 23/01 |
| 2002/0049622 A1 | 4/2002 | Lettich et al. | |
| 2002/0123840 A1 * | 9/2002 | Obata | G01C 21/26 701/517 |

(Continued)

OTHER PUBLICATIONS

Bettac et al.; RELOOP: reverse logistics chain optimisation in a multi-user trading environment.

(Continued)

*Primary Examiner* — Frederick M Brushaber
(74) *Attorney, Agent, or Firm* — Rock IP, PLLC

(57) ABSTRACT

A system is disclosed for managing waste services. The system may have a memory with computer-executable instructions stored thereon, and a processor. The processor may be configured to execute the instructions to receive, via a first portal, sensor data and location data associated with a service vehicle; to make a determination based on the location data of whether the service vehicle is stopped or moving; and based on the determination, to selectively show on a second portal, confirmation of a service activity completed by the service vehicle or an irregularity in a roadway traveled by the service vehicle corresponding to the sensor data.

20 Claims, 3 Drawing Sheets

(56) References Cited

U.S. PATENT DOCUMENTS

| | | | | |
|---|---|---|---|---|
| 2002/0198653 | A1* | 12/2002 | Lutter | G08G 1/0965 |
| | | | | 701/418 |
| 2005/0065711 | A1 | 3/2005 | Dahlgren et al. | |
| 2005/0171692 | A1 | 8/2005 | Hamblen et al. | |
| 2010/0119341 | A1 | 5/2010 | Flood et al. | |
| 2011/0029236 | A1* | 2/2011 | Zhou | G01C 21/20 |
| | | | | 701/532 |
| 2016/0133133 | A1* | 5/2016 | Triplett | H04W 4/02 |
| | | | | 340/932.2 |
| 2016/0379152 | A1* | 12/2016 | Rodoni | G06Q 10/06398 |
| | | | | 705/7.15 |
| 2016/0379154 | A1* | 12/2016 | Rodoni | G06Q 10/30 |
| | | | | 705/7.15 |
| 2017/0011270 | A1* | 1/2017 | Kamada | G01W 1/00 |
| 2017/0144669 | A1* | 5/2017 | Spata | E01C 23/01 |
| 2019/0056742 | A1* | 2/2019 | Ho | B60W 50/029 |

OTHER PUBLICATIONS

International Search Report dated Apr. 26, 2018 in PCT/US2018/018189; 8 pages.

\* cited by examiner

WASTE MANAGEMENT SYSTEM HAVING ROADWAY CONDITION DETECTION

TECHNICAL FIELD

The present disclosure relates generally to a waste management system and, more particularly, to a waste management system having roadway condition detection.

BACKGROUND

Waste service providers employ fleets of vehicles that perform a variety of services for their subscribing customers. These services can include drop-off of waste receptacles, pick-up of waste receptacles, and/or emptying of waste receptacles. In some instances, confirmation that the services were performed may be helpful. For example, billing and/or payment for the services may depend on the services being performed on time, performed at a particular location, and/or performed in a particular manner. Service confirmation has historically been completed manually, for example by an operator of a service vehicle checking off each service as it is completed. Unfortunately, self-reporting by the vehicle operator may allow for error introduction and/or take the operator's attention away from operating the vehicle.

Automated service confirmation systems have recently been introduced. These systems employ sensors that detect vehicle motion and/or performance parameters associated with a receptacle being lifted, tilted, dumped, or set down. The performance parameters can include, for example, vibrational signatures and/or detected movements (e.g., speeds, accelerations, forces, etc.) of the vehicle and/or particular portions of the vehicle (e.g., of lift arms, actuators, beds, compactors, doors, etc.).

Although the use of the sensors by the automated systems may improve service confirmation, the sensors may only be used for that specific purpose and for only a small fraction of the operational time of the service vehicle. In particular, the sensors may normally be turned off and/or ignored while the vehicle is traveling, and only turned on and/or monitored during performance of a service activity while the vehicle is stopped. The automated service confirmation system may be expensive, and the limited use of the associated sensors may be inefficient.

The disclosed system is directed to overcoming one or more of the problems set forth above and/or other problems of the prior art.

SUMMARY

In one aspect, the present disclosure is directed to a system for managing waste services. The waste management system may include a memory with computer-executable instructions stored thereon, and a processor. The processor may be configured to execute the instructions to receive, via a first portal, sensor data and location data associated with a service vehicle; to make a determination based on the location data of whether the service vehicle is stopped or moving; and based on the determination, to selectively show on a second portal, confirmation of a service activity completed by the service vehicle or an irregularity in a roadway traveled by the service vehicle corresponding to the sensor data.

In another aspect, the present disclosure is directed to method for managing waste services. The method may include receiving, via a first portal, sensor data and location data associated with a service vehicle, and making a determination based on the location data of whether the service vehicle is stopped or moving. The method may also include selectively showing on a second portal, based on the determination, confirmation of a service activity completed by the service vehicle or an irregularity in a roadway traveled by the service vehicle corresponding to the sensor data.

In yet another aspect, the present disclosure is directed to a non-transitory computer readable medium containing computer-executable programmable instructions for performing a method of waste service management. The method may include receiving, via a first portal, sensor data from at least one of a lift sensor and a vibration sensor onboard a service vehicle; and receiving location data from a locating device onboard the service vehicle. The method may also include making a determination based on the location data of whether the service vehicle is stopped or moving and, based on the determination, selectively showing on a second portal, confirmation of a service activity completed by the service vehicle or an irregularity in a roadway traveled by the service vehicle corresponding to the sensor data.

DETAILED DESCRIPTION

Figure 1:
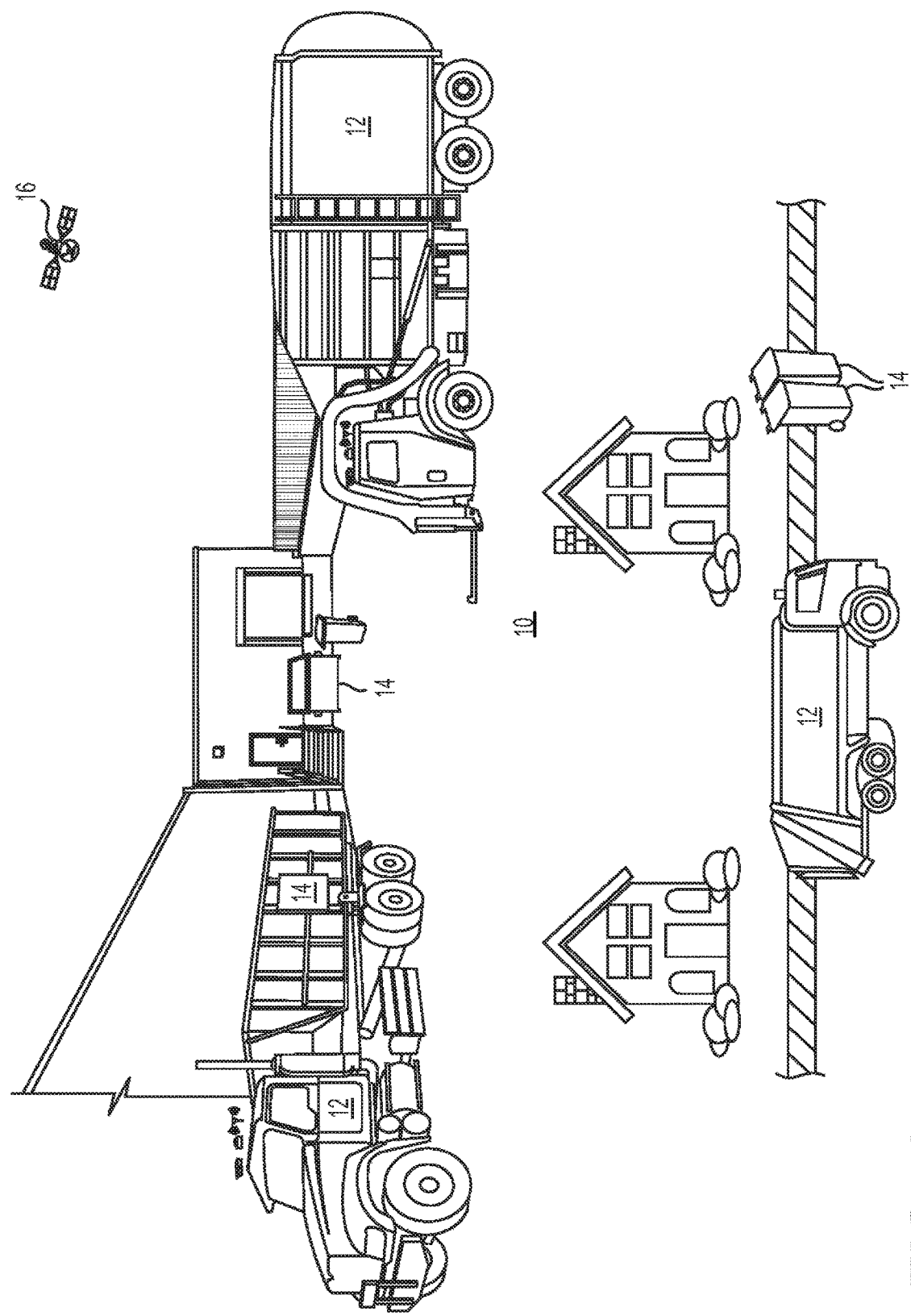
FIG. 1 is a perspective illustration of an exemplary disclosed waste service environment.

FIG. 1 illustrates an exemplary waste service environment ("environment") 10, at which one or more vehicles 12 are providing service for any number of different customers. Environment 10 could stretch over a wide area and include, for example, a retail store, a factory, a government building, a residential address, and/or another location having one or more receptacles 14 that require the services of vehicles 12. The services may include, for example, the removal of waste materials from inside of receptacle(s) 14; the transportation of the waste materials and/or receptacles 14 to a landfill, recycling center, or sorting facility; containment and/or treatment of hazardous waste materials; waste cleanup; etc.

Vehicles 12 may embody haul trucks (and/or trailers that are attachable to the haul trucks), which include or otherwise carry a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch. For example, management personnel may be able to manually lift and tilt receptacles 14 into the storage compartment of a rear-hatch vehicle 12, thereby emptying receptacle 14 of the associated waste. In another example, vehicles 12 may include mechanical, electrical, and/or hydraulic systems configured to automatically grasp, lift, tilt, and thereby empty receptacles 14 into vehicle 12 via a top-hatch. In yet another example, some tasks (e.g., grasping) may be completed manually and other tasks (e.g., lifting and tilting) may be completed with the assistance of the mechanical, electrical, and/or hydraulic systems via a side-hatch of vehicle 12. In a final example, receptacle 14 may simply be loaded (e.g., manually, automatically, or semi-automatically) together with the waste contents onto vehicle 12 and transported away for emptying at another location.

As each vehicle 12 moves about environment 10, a satellite 16 or other tracking device may communicate with an onboard controller 30 (shown only in FIG. 2) to monitor the movements of vehicle 12 and the associated changes made to environment 10 (e.g., pickup, transporting, dumping, placing, etc.). As will be explained in more detail below, onboard controller 30 may network with a central processing unit ("CPU") 32 (e.g., a processing unit located in a back office or other service facility), which may then manage service activities of each vehicle 12 based on these movements and changes.

Onboard controller 30 may include means for monitoring, recording, storing, indexing, processing, communicating and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on, or read from, different types of computer program products or computer-readable media such as computer chips and secondary storage devices, including hard disks, floppy disks, optical media, CD-ROM, or other forms of RAM or ROM.

Figure 2:
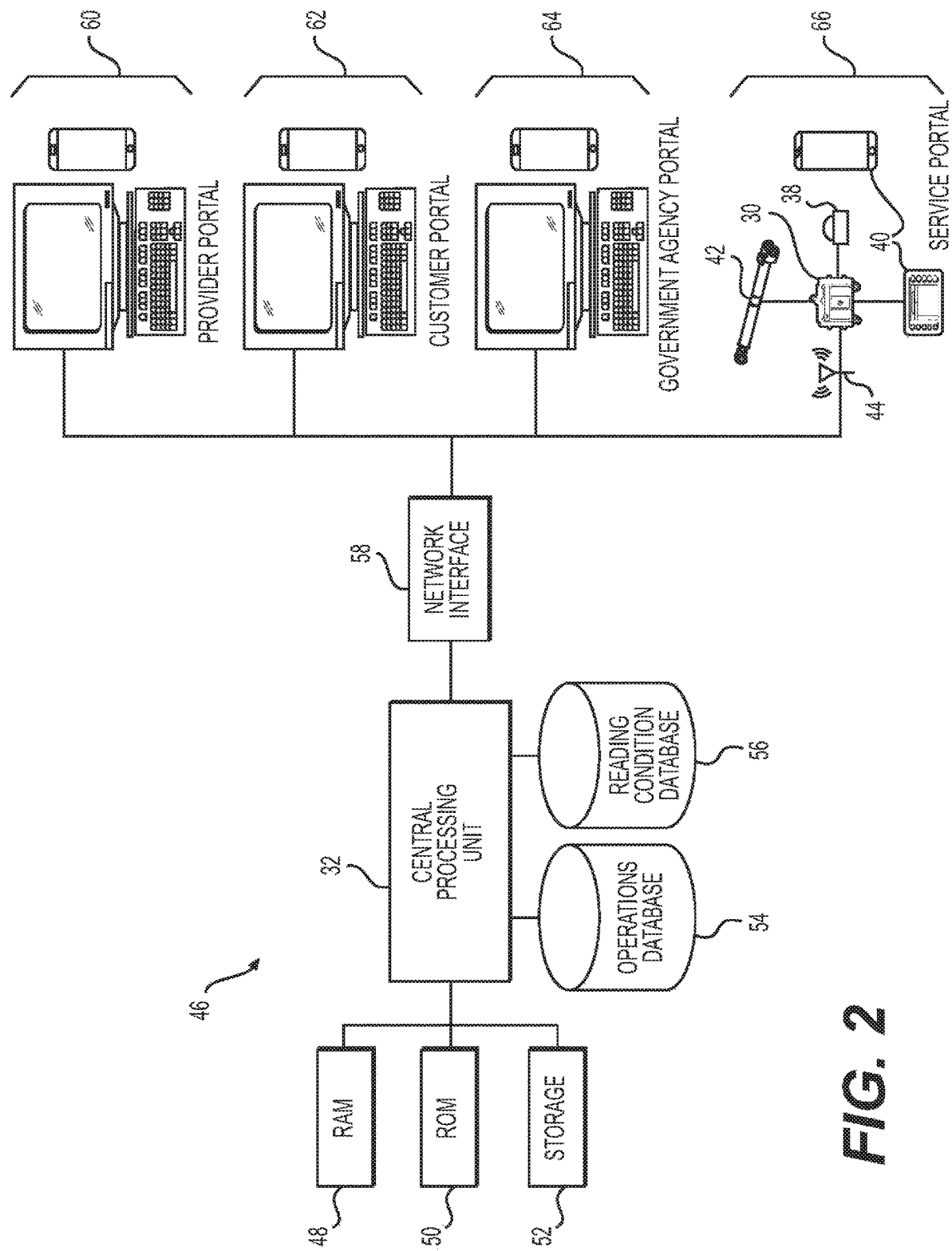
FIG. 2 is a diagrammatic illustration of an exemplary disclosed system that may be used to manage the services depicted in FIG. 1.

Onboard controller 30 may be configured to track, assist, and/or control movements of the associated vehicle(s) 12. As shown in FIG. 2, in addition to onboard controller 30, each vehicle 12 could additionally include a locating device 38, and at least one of a manual input device 40 and a sensor 42 mounted or otherwise located onboard each vehicle 12. In some embodiments, vehicle 12 is equipped with both manual input device 40 and one or more sensors 42. Onboard controller 30 may be in communication with each of these other components and/or with CPU 32 at the back office (e.g., via a communication device 44), and configured to determine, based on signal data received from these components and based on other known information stored in memory, operational characteristics of each vehicle 12 and/or operational characteristics of receptacles 14 (and/or the waste inside of receptacles 14) being moved by and/or in a vicinity of each vehicle 12. The operational characteristics may include, among other things, a vehicle and/or receptacle identification, a vehicle and/or receptacle location, a vehicle and/or receptacle weight, a vehicle speed, a waste material type and/or amount, an origination, a destination, vehicle emissions, and other service-related data.

Locating device 38 may be configured to generate location data indicative of a geographical position and/or orientation of vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 16 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of vehicle 12, for example of a receptacle lift mechanism. Based on signals generated by locating device 38 (i.e., based on the location data) and based on known kinematics of vehicle 12, onboard controller 30 may be able to determine in real time the position, heading, travel speed, acceleration, and orientation of vehicle 12 and the lift mechanism. This information may then be used by onboard controller 30 and/or CPU 32 to update the operational characteristics of vehicles 12 and/or receptacles 14.

Input device 40 may provide a way for an operator of vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about receptacle 14 and the waste engaged by, loaded into, or otherwise processed by vehicle 12. The information may be input in any number of ways, for example via a cab-mounted touch screen interface, via one or more buttons, via a keyboard, via speech recognition, via a smartphone carried by the operator, or in another manner known in the art. In some embodiments, in addition to receiving manual input from an operator, input device 40 may also be capable of displaying information, for example an electronic map of environment 10, a schedule, directions, instructions from the back office, payload information, corresponding regulations, etc.

Sensors 42 may be configured to monitor parameters associated with the waste material loaded into vehicle 12 and/or the corresponding receptacle(s) 14 being moved by vehicle 12, and to generate sensor data indicative thereof. Each of these sensors 42 may be any type of device known in the art, and located anywhere on or in vehicle 12. In one example, sensor 42 may embody a lift sensor, for example any one or more of a load cell, a force gauge, a pressure sensor, or another type of load detector associated with compacting, containing, dumping, lifting, supporting or otherwise moving the waste received from receptacle 14. In this example, signals generated by sensor(s) 42 (i.e., the sensor data) may correspond with a lift force and/or a payload weight of vehicle 12 and/or receptacles 14.

Alternatively, one or more sensors 42 may be associated with a power source or drivetrain of vehicle 12, and configured to generate signals indicative of an amount of power used to propel vehicle 12, to drive hydraulics of lift actuators, to move an in-bed compactor, or to shut an associated door. Visual types of sensors 42 (e.g., cameras, spectrometers, IR sensors, RADAR sensors, LIDAR sensors, etc.) may also or alternatively be utilized to determine the operational characteristics of service vehicle 12, the waste material inside receptacles 14, and/or of receptacles 14 themselves. In yet further examples, sensor 42 could be a vibration sensor (e.g., a microphone), an accelerometer, or another similar type of sensor configured to detect engagement conditions, motions, and/or cycle completions during lifting, dumping, shaking and/or travel operations. Other types of sensors 42 may alternatively or additionally be utilized. Data generated by these sensors 42 may be communicated to onboard controller 30 for further processing.

Any one or more of the components described above could be integrally formed and/or packaged, if desired. For example, sensors(s) 42 and/or controller 30 may form integral portions of input device 40 (e.g., the smartphone or tablet carried by the operator) or be standalone components in wired or wireless communication with input device 40, as desired.

Onboard controller 30 may be configured to manage communications between other onboard components and CPU 32 located at the back office. For example, onboard controller 30 may receive data from locating device 38, input device(s) 40, and sensors 42, and correlate the data, filter the data, buffer the data, record the data, or otherwise condition the data before directing the data offboard via communication device 44.

Communication device 44 may be configured to facilitate communication between onboard controller 30 and CPU 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and CPU 32 may communicate directly with locating device 38, input device(s) 40, and/or sensor(s) 42 via communication device 44, if desired. Other means of communication may also be possible.

As shown in FIG. 2, onboard controller 30 (along with the other connected onboard components) and CPU 32 may each form a portion of a waste management system ("system") 46 configured to generate, maintain, analyze, compare, send, solicit, confirm, display, receive and/or record information associated with the disclosed concepts. System 46 may include, for example, a random access memory (RAM) 48, a read-only memory (ROM) 50, a storage 52, at least one database (e.g., an operations database 54 and roadway condition database 56), a network interface 58, and at least one user portal (e.g., a provider portal 60, a customer portal 62, a government agency portal 64, and an service portal 66). As will be explained in more detail below, CPU 32 may be configured to receive data from different users via portals 60-66, and to compare, process, record, and share the data with the same and/or with other users via the same or different portals 60-66. It is contemplated that system 46 may include additional, fewer, and/or different components than those listed above. It is understood that the type and number of listed devices are exemplary only and not intended to be limiting.

CPU 32 may include an arrangement of electronic circuitry configured to perform arithmetic, logic, input/output, and control operations during sequential execution of preprogrammed instructions. The instructions may be loaded from ROM 50 into RAM 48 for execution by CPU 32. It should be noted that, although CPU 32 is shown and described as a single "unit", it is contemplated that the functions of CPU 32 could alternatively be completed by any number of co-located or remotely distributed and cooperating processing units, as desired. Numerous commercially available microprocessors may be configured to perform the functions of CPU 32. Further, the microprocessors may be general-purpose processors or specially constructed for use in implementing the disclosed concepts. It should be noted that, although CPU 32 is described herein as a separate component located at the back office, it is contemplated that CPU 32 could form a portion of one or more of portals 60-66 and/or be located elsewhere (e.g., onboard vehicle 12), if desired.

Storage 52 may embody any appropriate type of mass storage provided to hold data and other information that CPU 32 may need in order to perform the disclosed processes. For example, storage 52 may include one or more hard disk devices, optical disk devices, or other storage devices that provide sufficient storage space.

Databases 54 and/or 56 may contain any information relating to particular service vehicle and roadway condition records under analysis. The information stored within databases 54 and/or 56 may come from multiple different sources and be provided at any time and frequency. For example, the information could be manually entered by service provider employees (e.g., via provider portal 60), manually entered by governmental agency employees (e.g., via government agency portal 64), manually entered by the customer, and/or automatically entered by onboard controller 30. The information may be entered live (e.g., as the information is collected and/or observed by a vehicle operator and/or the customer), entered based on a predetermined schedule (e.g., based on regular downloads of roadway condition and/or waste service data), continuously streamed (e.g., via a live link to roadway condition information), or obtained in any other manner at any other time and frequency. In addition to the waste service and roadway condition information, databases 54 and/or 56 may also include analysis tools for analyzing the information stored therein. CPU 32 may use databases 54 and/or 56 to make comparisons and/or determinations regarding relationships and/or trends relating to particular customers, service vehicles 12, service vehicle drivers, locations, roadway conditions, uses of system 46, and other such pieces of information. CPU 32 may pull data and other information from databases 54 and/or 56, manipulate the information, and analyze the information. CPU 32 may also update the information, store new information, and store analysis results within databases 54 and/or 56, as desired.

CPU 32 may communicate with a user of system 46 (e.g., a user accessing any one of portals 60-66) via network interface 58. Network interface 58 may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components. For example, the communication links may include non-proprietary links and protocols, or proprietary links and protocols based on known industry standards, such as J1939, RS-234, RP1210, RS-422, RS-485, MODBUS, CAN, SAEJ1587, Bluetooth, the Internet, an intranet, 802.11 (b, g, n, ac, or ad), or any other communication links and/or protocols known in the art.

Each of portals 60-66 can include one or more of a router, an Ethernet bridge, a modem (e.g., a wired or wireless modem), or any other conventional computing components known in the art (not shown) such as a processor, input/output (I/O) ports, a storage, and a memory. The processor of each portal 60-66 can include one or more processing devices, such as microprocessors and/or embedded controllers. The storage can include volatile or non-volatile, magnetic, semiconductor, tape, optical, removable, non-removable, or other type of computer-readable medium or computer-readable storage device. The storage can be configured to store software programs (e.g., apps) downloaded from CPU 32 via network interface 58 and/or other information that can be used to implement one or more of the disclosed processes. The memory can include one or more storage devices configured to store the downloaded information. Each of portals 60-66 may be able to communicate with CPU 32, with databases 54 and/or 56, and/or directly with another of portals 60-66 via network interface 58.

Each of portals 60-66 may provide a graphical user interface (GUI) that is configured to display information to users thereof, and that includes a means for receiving input from the user. In one embodiment, an exemplary portal is a computer (e.g., a laptop or desktop computer) having a console and a keyboard/mouse. In another embodiment, an exemplary portal is a handheld mobile device, such as a smart phone or a tablet having a touchscreen display and/or a keyboard. Other types of portals may also be utilized. The GUI of portals 60-66 may allow the user to receive (e.g., visually and/or audibly) information from system 46 via network interface 58, to upload information to system 46, and/or to correspond with other users of system 46.

Portal 60 may be dedicated for use by an employee and/or service provider representative of system 46 (e.g., an account representative, a service manager, etc.). It is contemplated that any number of portals 60 may be simultaneously connected to network interface 58 for use by any number of different users. Each such portal 60 may allow the representative to log into system 46 (e.g., via a web-based program, an internet site, or a mobile app) and to monitor a particular service event (e.g., a historic event or a live event, such as waste pickup, transportation, and/or disposal), to view a condition of a service roadway (e.g., use of particular roadways; irregularities in the roadways, such as potholes or frost heaves; measures of the irregularities such as depth, height, diameter, or severity; frequency and/or spacing of irregularities; etc.), to compare aspects of particular roadways, to alert operators of the roadway irregularities, to reward and/or penalize operators for use of particular roadways, to share (e.g., publish, post, email, send, announce, etc.) roadway irregularities with customers and/or the government agencies, and/or for other similar purposes.

Customer portal 62 may be intended for use by a customer of the service provider (e.g., a customer owning roadways traversed by service vehicle 12). It is contemplated that any number of portals 62 may be simultaneously connected to network interface 58 for use by any number of different customers. Each such portal 60 may allow the customer to access system 46 (e.g., via a web-based program, an internet site, or a mobile app) and to view and/or publish information relating to observed and/or measured irregularities in the roadways privately owned by the customers.

Government agency portal 64 may be dedicated for use by a government agency representative (e.g., a representative responsible for conditions of public roadways). It is contemplated that any number of portals 64 may be simultaneously connected to network interface 58 for use by any number of different representatives associated with the same or different government agency (e.g., by a federal, state, or local agency). Each such portal 64 may allow the representative to log into system 46 (e.g., via a web-based program, an internet site, or a mobile app) and to view condition data existing in database 56, to update the data, and to respond to open inquiries regarding past, current, and/or proposed solutions to particular roadway irregularities. In some embodiments, portals 64 may provide a way for government agencies to reward the service provider for the roadway condition data.

Service portal 66 may be dedicated to the input of data and other information generated onboard vehicles 12 and/or for the general use by vehicle operators. In some examples, the data is automatically provided by way of locating device 38 and sensors 42. In other examples, the information is manually provided by way of input device(s) 40. The data may include, for example, the location of each vehicle 12, a travel path of vehicle 12 along particular roadways, a schedule of stops, a status of a particular service event (e.g., if the service has been started, is ongoing, has been completed, or is problematic), an origination of waste material being transported by a particular service vehicle 12, a route of the service vehicle, a destination, the condition (detected and/or observed roadway irregularities) of particular roadways, and other information. It is contemplated that the functionality of service portal 66 could alternatively be provided by way of provider portal 60 (or another portal), if desired.

Based on the information received from portals 60-66, CPU 32 can be configured to execute instructions stored on computer readable medium to perform methods of waste service management at environment 10. For example, CPU 32 may be configured to monitor waste services as they are being performed (and/or at a later time, such as after download of data from one or more portals), to compare the services to customer requirements, and to provide feedback (e.g., to the service provider, the operators, the customer, etc.) based on the monitored services. In addition, between service events, CPU 32 may be configured to monitor vehicle travel along particular roadways, to detect roadway irregularities, to quantify and/or rate the irregularities, and to report the irregularities to the responsible parties. These processes are illustrated in FIG. 3, and will be explained in more detail in the following section to further illustrate the disclosed concepts.

INDUSTRIAL APPLICABILITY

The disclosed system may be applicable to the waste service industry, where service vehicles 12 operate over a variety of private and public roadways having a range of conditions. The disclosed system may consider operational characteristics of individual service vehicles during travel time between service events, and produce roadway condition data associated with the information. The roadway condition data may be provided to the parties responsible for the roadways (e.g., to customers and/or government agencies). In addition, recommendations may be provided to the responsible parties (e.g., regarding repairs) and/or to the vehicle operators (e.g., to follow particular travel paths that avoid severe irregularities), and the customers and/or operators may be selectively rewarded for following the recommendations. Operation of system 46 will now be described with reference to FIG. 3.

Figure 3:
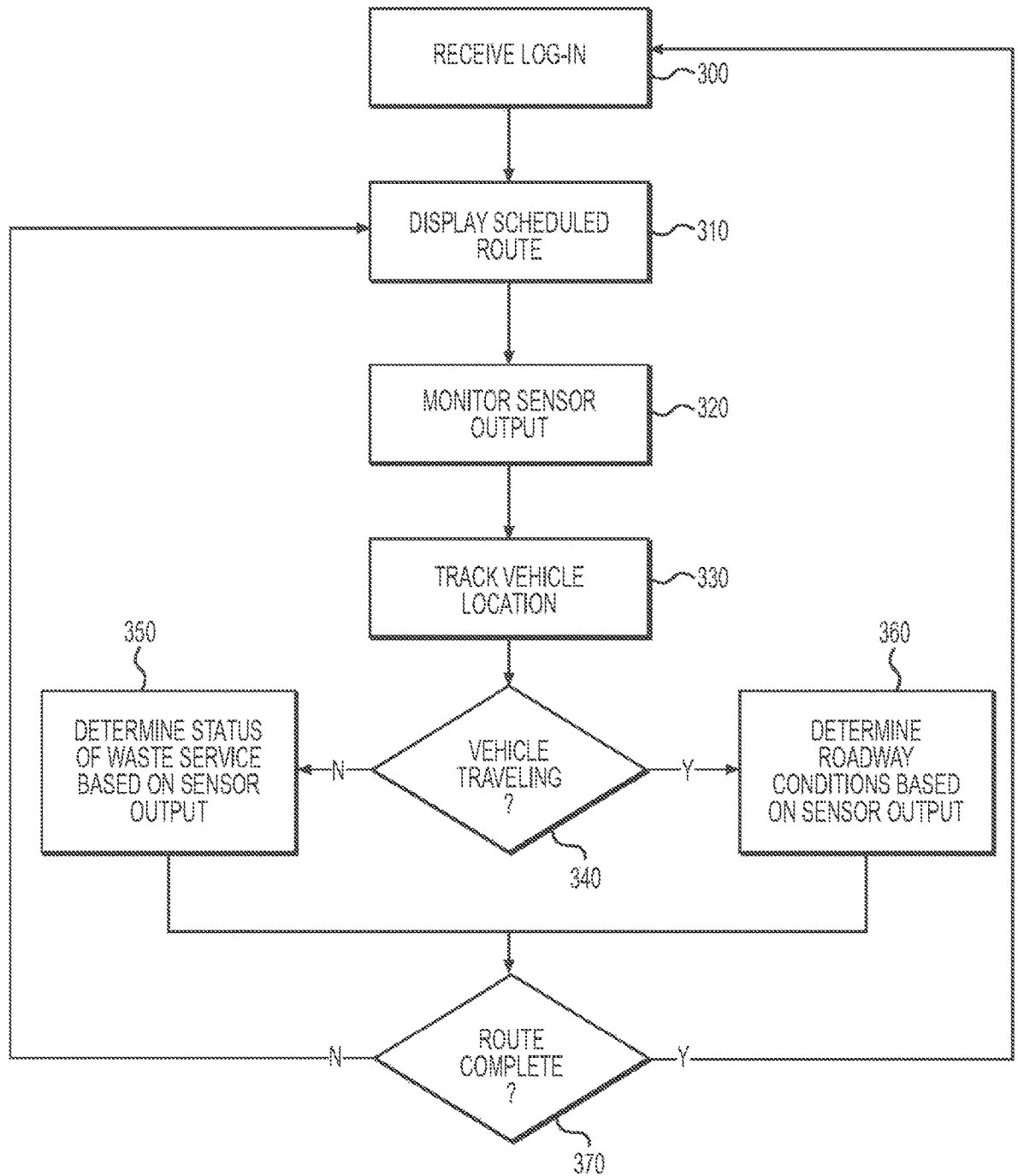
FIG. 3 is a flowchart depicting an exemplary disclosed method that may be performed by the system of FIG. 2.

As seen in FIG. 3, the method implemented by CPU 32 (and/or controller 30) may begin when a vehicle operator logs into the disclosed system (Step 300). Login may be completed, for example, via portal 60 and/or 66. During this login, the operator may provide, for example, an identification of the operator and/or of the particular service vehicle 12 that will be driven by the operator for the given work shift. CPU 32 may then determine and display (e.g., via input device 40) a route of scheduled stops at which the operator should perform a particular service during the work shift (Step 310). In some instances, the route may be determined automatically by CPU 32, for example based on the service vehicle identification, the operator identification, the day of the week, a detected travel pattern of service vehicle 12, or another similar factor. In other instances, the route may be manually selected (e.g., by the operator and/or a supervisor) from among a plurality of available routes. Display of the route may include, among other things, a listing of the service stops, a recommended travel path to the service stops (e.g., along particular roadways having fewer irregularities and/or irregularities of lower severity), a map of the service stops and/or roadways, service information about each stop (e.g., an expected number and/or size of receptacles 14 at each target location), and/or a schedule of when service should be performed.

After receiving the route (e.g., as electronic data stored inside input device 40), the operator may drive service vehicle 12 toward a service stop listed in the route. During operation of vehicle 12, CPU 32 may monitor vehicle operations by way of sensor(s) 42 (Step 320). CPU 32 may also track the location of service vehicle 12 (Step 330) to determine an approximate position of service vehicle 12 on a specific roadway, and also to determine if vehicle 12 is stopped or traveling. The approximate position of service vehicle 12 may be determined based on signals generated by locating device(s) 38, with a minimum change in position relative to threshold amount of time indicating that vehicle 12 is traveling.

CPU 32 may compare the position of service vehicle 12 to the minimum change and the threshold amount of time, and selectively use the data received from sensor(s) 42 to either detect service completion or to detect irregularities in the roadways being traversed by vehicle 12 based on the comparison (Step 340). In particular, when CPU 32 determines that service vehicle 12 is not traveling (i.e., that the position of vehicle 12 has not changed significantly, with respect to time), CPU 32 may correlate any signals produced by sensor(s) 42 during that time to service-related activities. That is, CPU 32 may determine a status of waste service activities scheduled to be completed at the current location of vehicle 12 based on the values of the signals produced by sensor(s) 42 while vehicle 12 is stopped at the current location (Step 350). For example, based on lift forces, acoustic signatures, detected motions, images, and/or other signals generated by sensor(s) 42, and also based on location data from device 38 corresponding to an anticipated service route and customer proximity, CPU 32 may determine that a particular receptacle 14 was lifted, tilted, shaken, dumped, onloaded, offloaded, set on the ground, moved, etc. These activities may then be compared to activities scheduled to have occurred at the current location, and CPU 32 may confirm completion in a desired manner and/or provide instruction regarding completion based on the comparison. A confirmation of the service may be presented to the service provider (e.g., via portal 60) and/or to the customer (e.g., via portal 62), as desired.

However, when CPU 32 determines that service vehicle 12 is traveling (i.e., that the position of vehicle 12 is changing significantly, with respect to time), CPU 32 may correlate any signals produced by sensor(s) 42 during that time to conditions of particular roadways being traversed by vehicle 12 at the time (Step 360). That is, CPU 32 may use the signals produced by sensor(s) 42 to determine a location of roadway irregularities, to count a number of irregularities, to determine a frequency and/or spatial relationship of the irregularities, to determine characteristics (e.g., depth, diameter, severity, etc.) of the irregularities, etc. CPU 32 may then correlate the irregularities and/or the particular roadway locations to the responsible party (e.g., to the customer owner of the private roadway or to the governmental agency responsible for the public roadway), and selectively record and/or communicate (e.g., via portals 62 and/or 64) the condition data. The condition data may be used by the responsible party to make corresponding repairs to the roadways and/or to implement traffic safety procedures (e.g., to reroute traffic, if necessary). The condition data may additionally be used by the service provider to recommend optimal and/or alternative routes to the vehicle operators, such that damage to vehicle 12 may be avoided and/or efficiencies of vehicle 12 may be improved. In some situations, the customer and/or operator may be selectively rewarded for making timely repairs and/or avoiding known irregularities. It should be noted that, in addition to the signals generated by sensor(s) 42, manual input received by CPU 32 via input device 40 may also be used to determine service activity completion and/or roadway condition data.

In some situations, action may only be taken when roadway irregularities exceed a particular threshold of severity. For example, the irregularities may only be recorded, mapped, communicated, avoided (e.g., by rerouting of service vehicle 12), etc., when the irregularities are larger than a threshold set by a customer, set by the service provider, set by a governmental agency, etc.

In some embodiments, one or more filters may be applied to the data analyzed by CPU 32 to ensure accuracy in determining roadway conditions. For example, a potential roadway condition may need to be detected multiple times and/or by multiple different vehicles 12, before being registered and/or mapped as an actual condition. In another example, a potential roadway condition may need to be compared to known factors (e.g., known roadway construction, weather conditions such as snow or ice accumulation, etc.) that influence detection and/or quantification of the condition. In yet another example, an image of the potential roadway condition may need to be captured (e.g., in response to detection via another means) and manually analyzed before recording, mapping, reporting, and/or avoiding.

Following completion of either of steps 350 or 360, CPU 32 may determine if the route of service vehicle 12 has been completed (Step 370). This determination may be made, for example, based on a comparison of an actual travel path to the displayed travel path and/or comparison of completed service stops to scheduled stops. When CPU 32 determines that the route of service vehicle 12 is complete, control may return to Step 300. Otherwise, control may return to Step 310.

The disclosed system may help waste service providers to remain updated on the status of ongoing service activities. In addition, utilizing the same system with existing hardware, conditions of the roadways traversed by service vehicle 12 may be detected and corresponding information may be provided to the service provider, the provider's customers, and governmental agencies. This information may allow the service provider to choose optimal routes that reduce vehicle damage and improve efficiencies. This information may also provide added value to the customer, allowing the customer to make necessary roadway repairs before the conditions become extreme and costly. This information may provide similar value to the government agencies.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing waste services, comprising:
   at least one location device located onboard a service vehicle configured to generate location data indicative of a geographical position of the service vehicle;
   one or more sensors configured to generate sensor data indicative of a waste service operation and a travel operation of the service vehicle;
   a memory having executable instructions stored thereon; and
   a processor configured to execute the instructions to:
      receive the sensor data and the location data;
      compare the location data of the service vehicle over a threshold amount of time to determine whether the service vehicle is stopped or traveling;

upon determining that the service vehicle is stopped within a threshold distance to a service location, monitor the sensor data to detect performance of a waste service operation at the service location;

upon determining that the service vehicle is traveling, monitor the sensor data to detect a roadway irregularity;

correlate location data of the service vehicle to the detected roadway irregularity to determine a location of the detected roadway irregularity; and determine characteristics of the detected roadway irregularity.

2. The system of claim 1, further comprising a first portal that is one of a service portal, provider portal, a customer portal, and a government agency portal.

3. The system of claim 2, wherein the processor is further configured to receive, via the first portal, manual input regarding observed completion of a service activity and observed roadway irregularities, and to selectively show on a second portal the confirmation of the service activity or the irregularity in the roadway based on the manual input.

4. The system of claim 1, wherein the one or more sensors are visual sensors.

5. The system of claim 1, wherein the one or more sensors are one of an image sensor, a lift sensor, and a vibration sensor.

6. The system of claim 1, wherein the processor is further configured to provide a recommendation based on the determining the presence of the roadway irregularity.

7. The system of claim 6, wherein the recommendation is provided to at least one of an operator of the service vehicle and a party responsible for the roadway.

8. The system of claim 7, wherein the recommendation includes at least one of an alternative travel path for the service vehicle and repairs for the roadway.

9. The system of claim 1, wherein the location data includes an approximate position of service vehicle on a specific roadway.

10. A method for managing waste services, the method comprising:

receiving sensor data and location data, the sensor data being generated by one or more sensors configured to detect a waste service operation and a travel operation of a service vehicle, the location data being generated by at least one location device onboard the service vehicle including a geographical position of the service vehicle;

compare the location data of the service vehicle over a threshold amount of time to determine whether the service vehicle is stopped or traveling;

upon determining that the service vehicle is stopped within a threshold distance to a service location, monitor the sensor data to detect performance of a waste service operation at the service location;

upon determining that the service vehicle is traveling, monitor the sensor data to detect a roadway irregularity;

correlate location data of the service vehicle to the detected roadway irregularity to determine a location of the detected roadway irregularity; and determine characteristics of the detected roadway irregularity.

11. The method of claim 10, wherein the one or more sensors include at least one of a lift sensor and a vibration sensor onboard the service vehicle.

12. The method of claim 10, further including receiving, via a first portal, manual input regarding observed completion of a service activity and observed roadway irregularities, wherein selectively showing on a second portal confirmation of the service activity or the roadway irregularity includes selectively showing on the second portal confirmation of the service activity or the roadway irregularity based further on the manual input.

13. The method of claim 10, further including providing a recommendation based on the determining the presence of the roadway irregularity.

14. The method of claim 13, wherein providing the recommendation includes providing the recommendation to at least one of an operator of the service vehicle and a party responsible for the roadway.

15. The method of claim 14, wherein providing the recommendation includes providing a recommendation to follow alternative travel path for the service vehicle or to repair the roadway.

16. The method of claim 10, wherein the location data includes an approximate position of service vehicle on a specific roadway.

17. A non-transitory computer readable medium containing computer-executable programming instructions for performing a method of waste service management, the method comprising:

receiving sensor data the sensor data being generated by one or more sensors configured to detect a waste service operation and a travel operation of a service vehicle, the location data being generated by at least one location device onboard the service vehicle including a geographical position of the service vehicle;

compare the location data of the service vehicle over a threshold amount of time to determine whether the service vehicle is stopped or traveling;

upon determining that the service vehicle is stopped within a threshold distance to a service location, monitor the sensor data to detect performance of a waste service operation at the service location;

compare the location data of the service vehicle over a threshold amount of time to determine whether the service vehicle is stopped or traveling;

upon determining that the service vehicle is stopped within a threshold distance to a service location, monitor the sensor data to detect performance of a waste service operation at the service location;

upon determining that the service vehicle is traveling, monitor the sensor data to detect a roadway irregularity;

correlate location data of the service vehicle to the detected roadway irregularity to determine a location of the detected roadway irregularity; and determine characteristics of the detected roadway irregularity.

18. The non-transitory computer readable medium of claim 17, wherein:

the method further includes receiving, via a first portal, manual input regarding observed completion of a service activity and observed roadway irregularities; and selectively showing on the second portal confirmation of the service activity or the irregularity includes selectively showing on the second portal confirmation of the service activity or the irregularity based further on the manual input.

19. The non-transitory computer readable medium of claim 17, further including providing a recommendation to at least one of an operator of the service vehicle and a party responsible for the roadway based on determining the presence of the irregularity.

20. The non-transitory computer readable medium of claim 19, wherein providing the recommendation includes providing a recommendation to follow alternative travel path for the service vehicle or to repair the roadway.

\* \* \* \* \*